E. C. TOWNLEY.
AUTOMOBILE JACK.
APPLICATION FILED JULY 28, 1915.
1,195,417.
Patented Aug. 22, 1916.
2 SHEETS—SHEET 1.
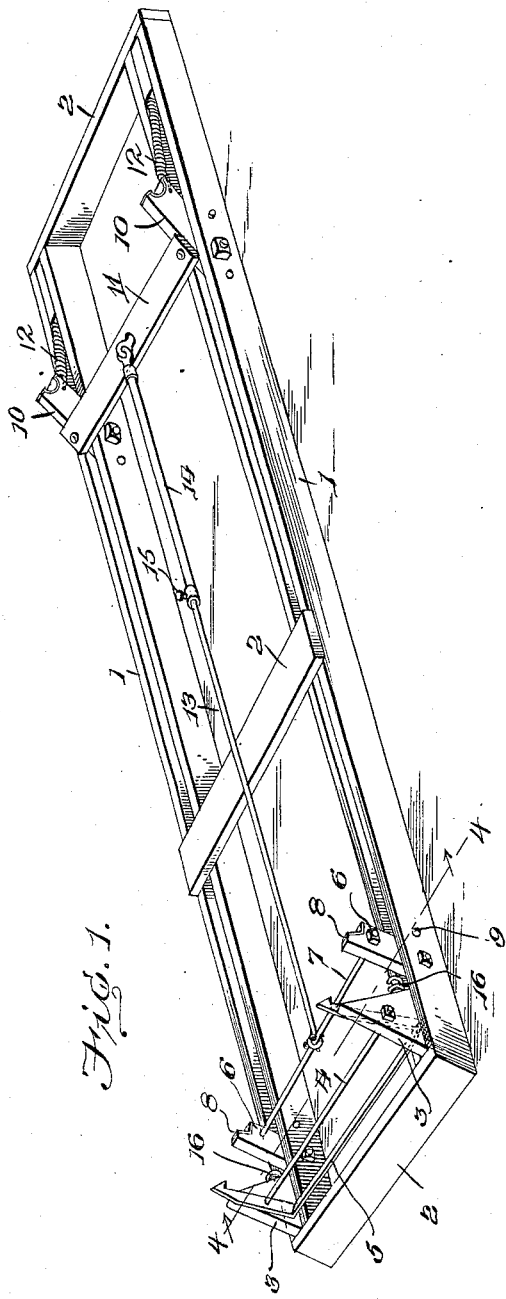
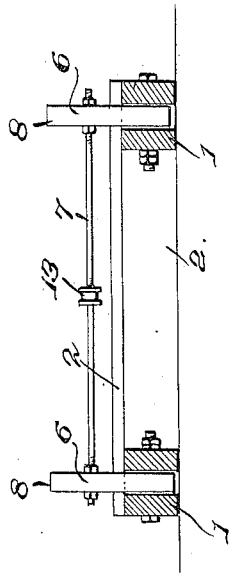
Inventor
E. C. Townley.
By
Hanlacey, Attorneys

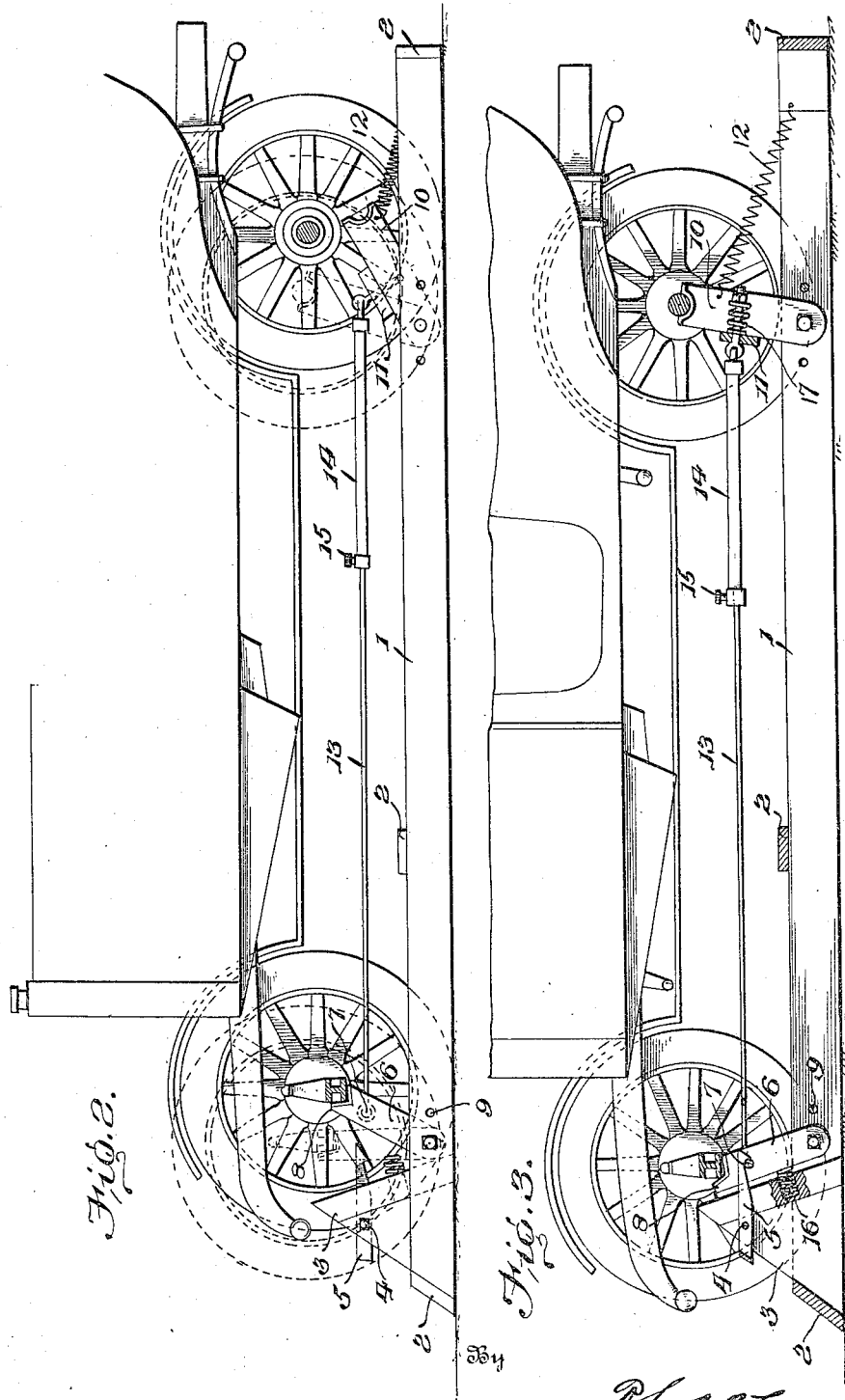

UNITED STATES PATENT OFFICE.

ERNEST C. TOWNLEY, OF ALLENVILLE, ILLINOIS.

AUTOMOBILE-JACK.

1,195,417.  Specification of Letters Patent.  Patented Aug. 22, 1916.

Application filed July 28, 1915. Serial No. 42,461.

*To all whom it may concern:*

Be it known that I, ERNEST C. TOWNLEY, a citizen of the United States, residing at Allenville, in the county of Moultrie and State of Illinois, have invented certain new and useful Improvements in Automobile-Jacks, of which the following is a specification.

The present invention has for its object the provision of novel means for elevating a vehicle when not in use, thereby overcoming in part the objection urged against subjecting pneumatic and soft tread tires to weight when the vehicle is left standing for any great length of time.

The invention provides a novel form of jack which is automatic in operation and serves to elevate the vehicle by the momentum and weight thereof, thereby enabling the vehicle when housed to be supported in such a manner as to relieve the tires of all weight, and furthermore enabling any one of the tires to be repaired or the wheels to be removed without requiring the same to be individually jacked up.

The invention further provides a jack which may be readily adapted for vehicles having different lengths of wheel base and which may be placed in any position admitting of the vehicle being run thereover so that advantage may be taken of the combined momentum and weight of the vehicle for lifting the same to cause the wheels to clear the surface and thereby relieve the tires of all weight.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a perspective view of an automobile jack embodying the invention; Fig. 2 is a side view, the normal position of the parts being shown by full lines and the dotted lines illustrating the initial movement of the lifting members when the same are partly operated; Fig. 3 is a vertical central longitudinal section showing the relation of the parts when the vehicle is supported in elevated position; Fig. 4 is a transverse section on the line 4—4 of Fig. 1 looking in the direction of the arrows.

Corresponding and like parts are referred to in the following description and indicated in all the views of the drawings by the same reference characters.

The jack comprises a suitable base and lifting members, the latter being pivoted to the base and provided in pairs, one pair for each axle of the vehicle.

While the base may be of any formation the construction illustrated is preferred and consists of an oblong frame embodying longitudinal members 1 and cross pieces 2. Each of the longitudinal members 1 is formed of companion bars which are transversely spaced so as to receive between them the pivoted lifting members. A stop 3 is disposed at one end of the base and acts in the capacity of a bumper to sustain the impact when the vehicle comes to rest and also to limit the forward movement of the lifting members. The stop 3 comprises like members which are located at the front ends of the longitudinal members 1 and which are secured between the companion bars forming such members. A rod 4 is supported at its ends in the members comprising the stop and a duplex catch 5 is mounted on the rod 4 and serves to engage and hold the lifting members in position when supporting the vehicle with its wheels clear of the surface. The duplex catch is substantially of U-form, the free ends of the side members being of hook-shape so as to engage with the adjacent pair of lifting members and secure the same in forward position.

There are four lifting members, the same being provided in pairs which are disposed near the front and the rear ends, respectively, of the base. The forward lifting members 6 have their lower ends pivoted between the bars of the longitudinal members 1 and are connected near their upper ends by means of a transverse rod or tie 7. This rod or tie 7 also serves as means to be engaged by the elements of the catch 5 so as to hold the lifting members 6 in forward adjusted position against the stop 3. Vertical projections 8 are disposed at the upper forward corners of the lifting members 6 and are adapted to be engaged by the front axle of the automobile or other vehicle when the same is run over the jack in position to be elevated thereby. The lifting members 6 are limited in their forward movement by means of the stop 3 and in their rearward movement by stops 9, the latter consisting of pins extending across the spaces formed between the bars comprising the longitudinal members 1.

The rear lifting members 10 are pivoted at their lower ends between the bars comprising the longitudinal members 1 and are connected by a cross piece 11, thereby causing both lifting members to move in unison. The upper ends of the lifting members 10 are depressed to form seats for receiving the rear axle of the automobile or other vehicle. The rear lifting members 10 are adjustable along the base to adapt the distance between the front and rear pairs of lifting members to the distance between the axles of automobiles having different wheel bases. Contractile helical springs 12 connect the rear lifting members with the base and serve to draw the same downward so as to clear the axles and admit of the vehicle being run over the jack either forwardly or rearwardly. An extensible rod or connection forms connecting means between the front and rear pairs of lifting members so as to cause both to move together. This extensible connection comprises telescoping parts 13 and 14, the part 13 consisting of a rod, whereas the part 14 is tubular and receives an end portion of the rod 13, the latter being secured to the part 14 in the required adjusted position by means of a set screw 15.

The jack is placed upon the floor of a garage or other structure in which automobiles and analogous vehicles are housed. The lifting members are adjusted so that the distance between the front and the rear lifting members corresponds approximately to the distance between the front and rear axles of the vehicle to be supported in elevated position by means of the jack. In the normal position of the lifting members they incline rearwardly, the rear members 10 being inclined at a greater angle than the front lifting members to admit of the axles clearing such rear members when the vehicle is run over the jack either forwardly or rearwardly. The front lifting members normally occupy a position so that their upper ends pass beneath the front axle and the vertical projections 8 engage with the forward side of such axle, hence a continued forward movement of the vehicle causes the front lifting members to turn and their upper ends to swing forwardly. The parts are so adjusted that when the front lifting members assume an approximately vertical position the upper ends of the rear lifting members come beneath the rear axle of the vehicle and a continued forward movement of the vehicle causes the rear lifting members to turn and elevate the rear axle. When the front members assume a vertical position the front axle of the vehicle is lifted about twice the distance required to lift the tires from the floor and when such front members swing forwardly from a vertical position so as to rest against the stops 3 the front axle is lowered and this lowering of the front axle is utilized for lifting the rear axle because the front and rear lifting members are connected to move in unison, hence as the upper ends of the front lifting members swing forward from a vertical position the upper ends of the rear lifting members approach a vertical position and thereby lift the rear axle.

When the vehicle comes to rest the front and rear lifting members incline similarly in opposite directions and the front and rear axles of the vehicle are lifted a like distance thereby elevating the four wheels to lift the tires thereof clear of the surface. The shock incident to the impact of the front lifting members 6 against the stop is modified or obviated by means of bumpers 16 which are mounted upon the elements comprising the stop 3 and preferably consist of stout helical springs. The rear lifting members are drawn upward and forward at their free ends by means of the extensible connection against the tension of the spring 12. When the front lifting members reach the limit of their forward movement they are held in such position by means of the duplex catch engaging the transverse rod or tie 7. When it is required to lower the vehicle and run the same outward from the housing the duplex catch 5 is tripped in any manner so as to release the rod 7 after which the vehicle will move rearward. The parts are so adjusted as to effect this result. The connecting rod is attached to the front lifting members a greater distance from the pivot connection of such members with the base than with the rear lifting members to admit of the latter folding close upon the base so as to be out of the way when running the vehicle upon or from the jack. When the vehicle is run into the garage or housing the front axle passes over the rear lifting members and is engaged by the projections 8 of the front lifting members, the latter being swung forward by the momentum of the vehicle. After the front lifting members pass forwardly of a dead center the weight and movement of the vehicle are utilized for lifting the rear axle as will be readily understood. To prevent the axles from becoming marred by contact with the lifting members the engaging ends of the latter may be padded or covered in any desired way.

The connecting rod has yieldable connection with the rear lifting members as shown at 17 to admit of the front members continuing to move forward after the rear members have engaged the rear axle.

It will be readily noted that the stops 3 are rigidly secured to the base and are immediately adjacent the front lifting members and in the same planes with the said members. The stops consequently will be engaged after a comparatively short swing of the front lifting members and will furnish a rigid support for the said members through the entire height of the same. The U-shaped duplex catch will tend to assume the position shown in Fig. 1, inasmuch as the weight of the intermediate cross bar of the latch will overbalance the hook-shaped ends thereof and when the front lifting members are arrested by the front stops, the jar from the impact will cause the catch to automatically swing so that its hook-shaped ends will engage over the cross bar connecting the front lifting members. When it is desired to release the automobile, downward pressure may easily be exerted upon the latch by the operator pressing his foot upon the intermediate cross portion of the latch, as will be readily understood, so that the vehicle may be released in a very short period of time. The construction and arrangement of the parts are exceedingly simple so that they are not apt to get out of order and if they should become damaged through accident or long continued use, the damaged part may be easily replaced or other repairs made by an unskilled person.

Having thus described the invention, what is claimed as new is:—

1. A vehicle jack comprising a base, front and rear lifting members pivoted at their lower ends to the base, a tie rod connecting the front lifting members near their free ends, means for connecting the front and rear lifting members, stops secured rigidly to and rising from the base immediately adjacent the front lifting members in the same planes with and in advance of the same, catch devices pivoted respectively relative to said stops in position to engage the tie rod adjacent to the front lifting members, and a combined connecting and operating bar extending between the catch devices.

2. A vehicle jack comprising a base, front and rear lifting members pivoted at their lower ends, a tie rod connecting the front lifting members near their free ends, means for connecting the front and rear lifting members, stops secured rigidly to and rising from the base immediately adjacent the front lifting members in the same plane with and in advance of the same, buffer devices carried by the stops, catch devices pivoted respectively relative to said stops in position to engage said tie rods adjacent the front lifting members and hold the lifting members strained against the buffers, and a combined connecting and operating bar extending between the catch devices.

In testimony whereof I affix my signature.

ERNEST C. TOWNLEY. [L. S.]

Copies of this patent may be obtained for five cents each, by addressing the "Commissioner of Patents, Washington, D. C."